United States Patent [19]

Levesque

[11] Patent Number: 5,085,389
[45] Date of Patent: Feb. 4, 1992

[54] BUILDING STUD SUPPORT

[76] Inventor: Joseph M. Levesque, P.O. Box 468 Hillside Ave., E. Barre, Vt. 05649

[21] Appl. No.: 685,883

[22] Filed: Apr. 16, 1991

[51] Int. Cl.$^5$ .............................................. A47H 1/10
[52] U.S. Cl. .................................. 248/300; 248/220.2
[58] Field of Search ............... 248/300, 309.1, 316.8, 248/220.2, 48.1, 48.2, 205.1, 218.4, 305; 52/712, 714, 702

[56] References Cited

U.S. PATENT DOCUMENTS

| | | | |
|---|---|---|---|
| 2,703,693 | 3/1955 | Cropanese | 248/300 X |
| 2,911,690 | 11/1959 | Sanford | 248/300 X |
| 3,343,329 | 9/1967 | Pohursky | 248/300 X |
| 3,730,472 | 5/1973 | Dole | 248/300 |
| 4,455,007 | 6/1984 | Varon et al. | 248/300 X |

Primary Examiner—Ramon O. Ramirez
Attorney, Agent, or Firm—Leon Gilden

[57] ABSTRACT

A support member including a first flange mounted to a second flange at an orthogonal angle, with the second flange mounted to a third flange at an included acute angle therebetween. The third flange mounted to a fourth flange defining a second acute angle therebetween, with the fifth flange mounted to the fourth flange at an orthogonal orientation thereto to frictionally clamp a building stud between a fifth, fourth, and third flange defining a "C" shaped clamping structure. An aperture is directed through the first flange to pivotally mount the organization relative to an underlying support, wherein the first flange at an intersection of the third and fourth flanges are arranged in a coplanar orientation relative to one another.

5 Claims, 4 Drawing Sheets

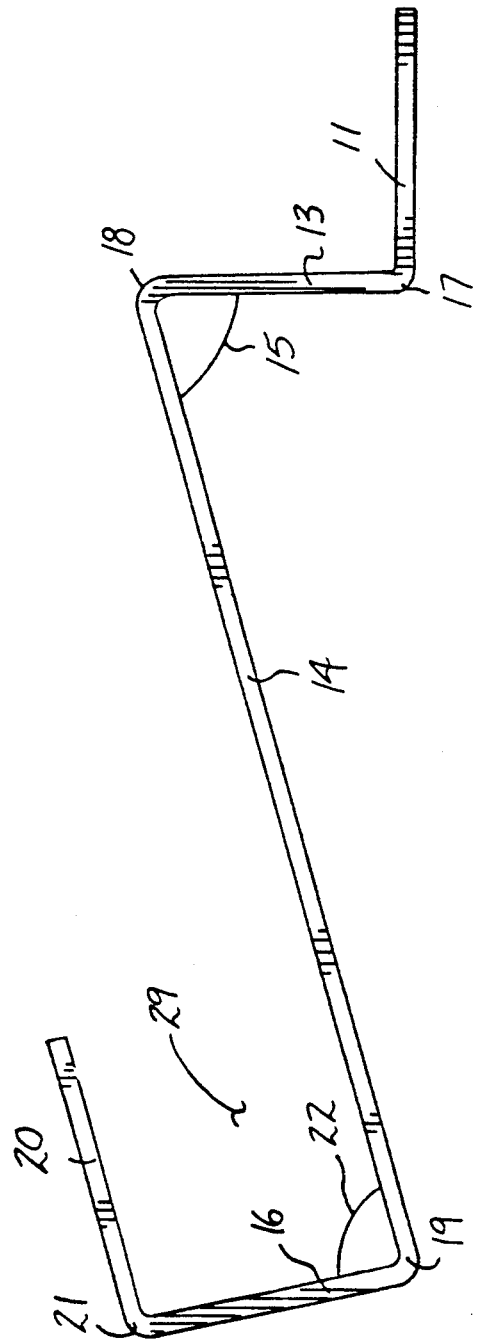
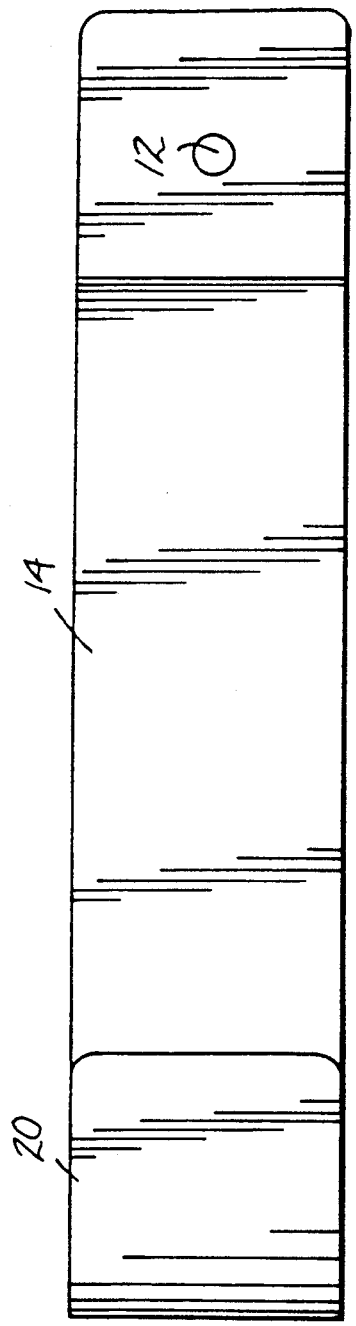

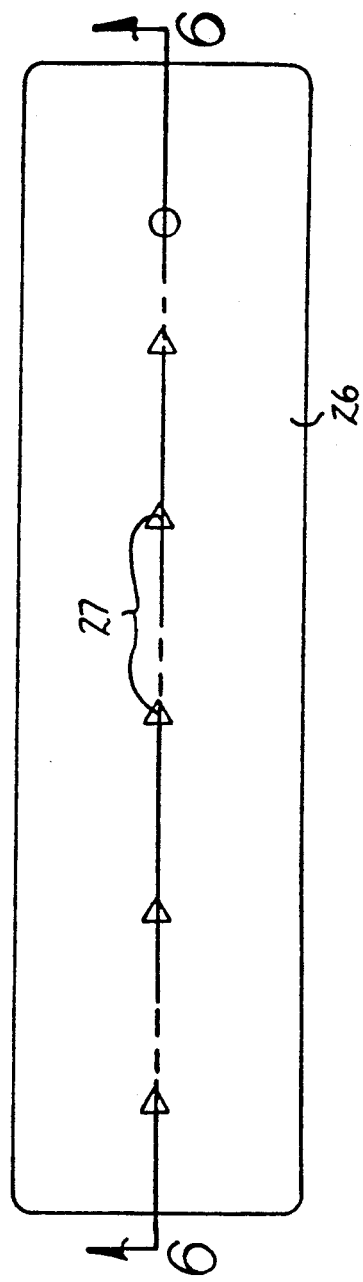
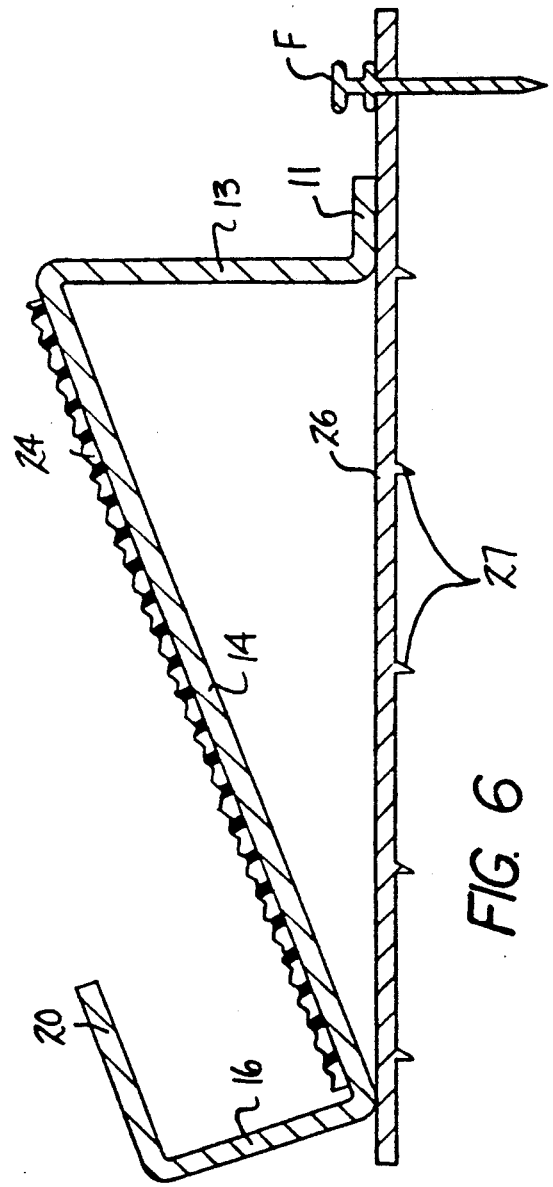
FIG. 5
FIG. 6

BUILDING STUD SUPPORT

BACKGROUND OF THE INVENTION

1. Field of the Invention

The field of invention relates to clamping apparatus, and more particularly pertains to a new and improved building stud support wherein the same is arranged for clampingly securing a building stud for a further processing thereof by sawing, drilling, and the like.

2. Description of the Prior Art

Various clamping apparatus has been utilized in the prior art to support building stud arrangements. Such organizations are typically of a relatively complex configuration relative to the instant invention. Such prior art is exemplified in U.S. Pat. No. 2,602,620 to Patton wherein the same provides a work holder provided by a "U" shaped cradle with a plurality of spaced clamping bars utilizing spikes to secure a stud member therebetween.

U.S. Pat. No. 3,782,431 to Cox sets forth a guide arranged to mount a router in an overlying relationship relative to an underlying work support.

U.S. Pat. No. 4,603,717 to Thomas sets forth a template arranged for the proper cutting of dove tailed joints.

U.S. Pat. No. 4,325,528 to Martin sets forth a bracket mounting arranged defined as a wall bracket for piercing a wall for a subsequent support of a hanging member, such as a pot and the like therefrom.

As such, it may be appreciated that there continues to be a need for a new and improved building stud support as set forth by the instant invention which addresses both the problems of ease of use as well as effectiveness in construction in the temporary clamping and mounting of a stud relative to an individual for the further sawing and cutting of the stud member and in this respect, the present invention substantially fulfills this need.

SUMMARY OF THE INVENTION

In view of the foregoing disadvantages inherent in the known types of clamping apparatus now present in the prior art, the present invention provides a building stud support wherein the same provides for a unitary serpentine bracket to clamp and position a stud for subsequent cutting thereof. As such, the general purpose of the present invention, which will be described subsequently in greater detail, is to provide a new and improved building stud support which has all the advantages of the prior art stud clamping apparatus and none of the disadvantages.

To attain this, the present invention provides a support member including a first flange mounted to a second flange at an orthogonal angle, with the second flange mounted to a third flange at an included acute angle therebetween. The third flange mounted to a fourth flange defining a second acute angle therebetween, with the fifth flange mounted to the fourth flange at an orthogonal orietnation thereto to frictionally clamp a building stud between a fifth, fourth, and third flange defining a "C" shaped clamping structure. An aperture is directed through the first flange to pivotally mount the organization relative to an underlying support, wherein the first flange at an intersection of the third and fourth flanges are arranged in a coplanar orientation relative to one another.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved building stud support which has all the advantages of the prior art stud clamping apparatus and none of the disadvantages.

It is another object of the present invention to provide a new and improved building stud support which may be easily and efficiently manufactured and marketed.

It is a further object of the present invention to provide a new and improved building stud support which is of a durable and reliable construction.

An even further object of the present invention is to provide a new and improved building stud support which is susceptible of a low cost of manufacture with regard to both materials and labor, and which accordingly is then susceptible of low prices of sale to the consuming public, thereby making such building stud supports economically available to the buying public.

Still yet another object of the present invention is to provide a new and improved building stud support which provides in the apparatuses and methods of the prior art some of the advantages thereof, while simultaneously overcoming some of the disadvantages normally associated therewith.

Still another object of the present invention is to provide a new and improved building stud support with a unitary bracket member to pivotally mount the organization relative to an underlying support for the temporary clamping and cutting of various building stud type members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view of the instant invention.

FIG. 3 is an orthographic top view of the instant invention.

FIG. 5 is an orthographic bottom view of a modification of the instant invention.

FIG. 6 is an orthographic side view, taken along the lines 6—6 of FIG. 5 in the direction indicated by the arrows.

DESCRIPTION OF THE PREFERRED EMBODIMENT

Figure 1:
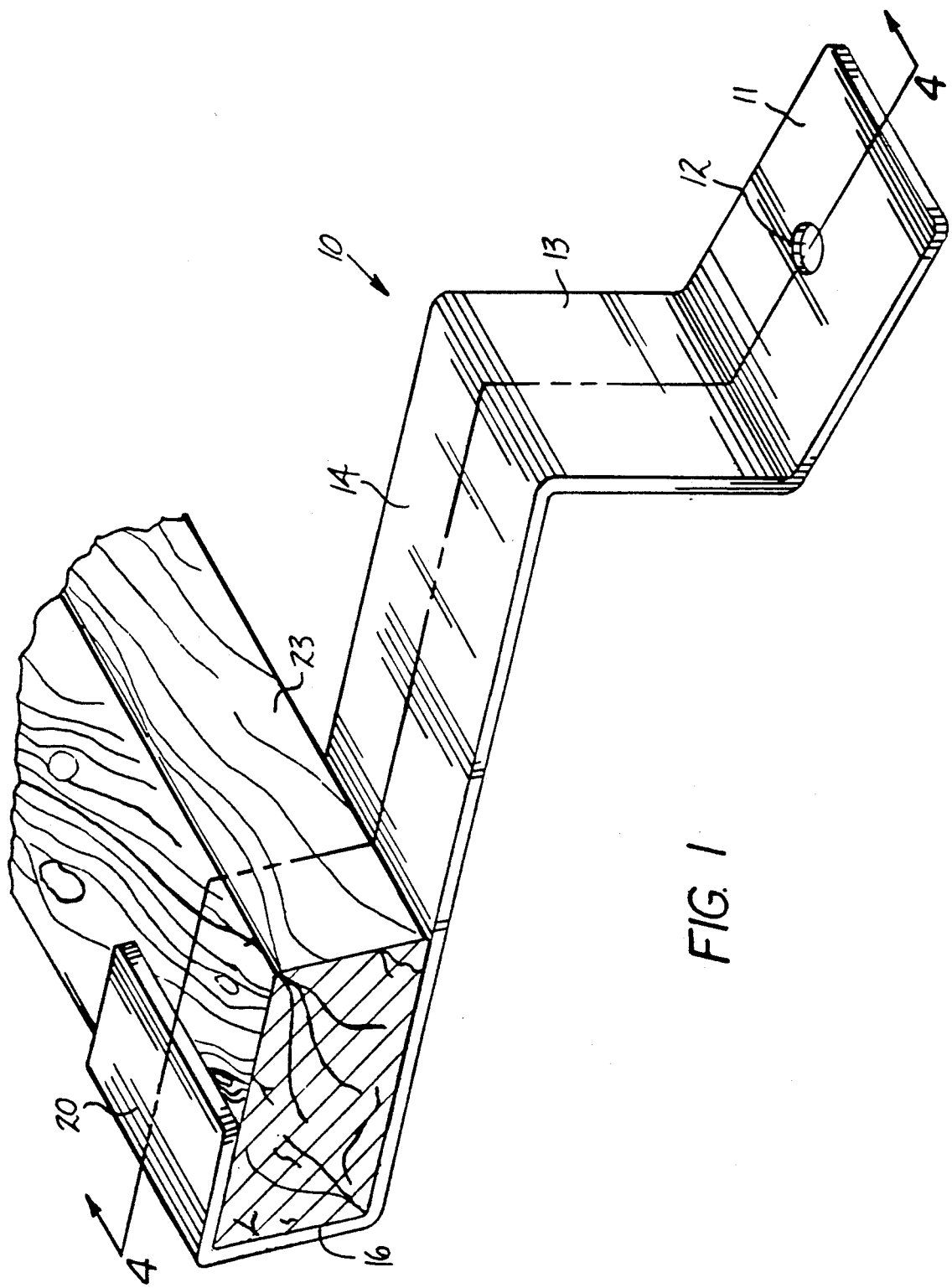
FIG. 1 is an isometric illustration of the instant invention.

With reference now to the drawings, and in particular to FIGS. 1 to 6 thereof, a new and improved building stud support embodying the principles and concepts of the present invention and generally designated by the reference numeral 10 will be described.

More specifically, the building stud support 10 of the instant invention essentially comprises a first flange plate 11, including an aperture 12 directed orthogonally therethrough. The first flange plate 12 is orthogonally and integrally mounted to a second flange plate 13 extending above the first flange plate 11. The second flange plate 13 is integrally mounted to a third flange plate 14 defined by a first acute included angle 15 therebetween. The third flange plate 14 extends downwardly relative to an upper edge of the second flange plate 13 to a third junction 19, wherein a fourth flange plate is integrally mounted to the third flange plate and extends above the third flange plate to a fourth junction 21. The fourth junction 21 includes a fifth flange plate 20 orthogonally and integrally mounted to the fourth flange plate 16, wherein the fifth flange plate 20 extends above the third flange plate a predetermined distance less than the predetermined length defined by the third flange plate 14. Accordingly, the third, fourth, and fifth flange plates define a "C" shaped cavity to clampingly receive a building stud 23 therewithin defined by a predetermined rectangular cross-sectional configuration, wherein the fifth flange plate 20 is normally biased towards the third flange plate 14, whereupon projection of the building stud 23 within the "C" shaped cavity effects spreading of the fifth flange plate 20 relative to the third flange plate 14. The second flange plate 13 is formed to the third flange plate 14 at a second junction, and wherein the first flange plate 11 is formed to the second flange plate 13 at a first junction. It should be noted that the first, second, and third junctions 17, 18, and 19, as well as the fourth junction 21, are each parallel relative to one another. A fastener "F" (see FIG. 4) is typically directed through the aperture 12 into an underlying support "S". It should be further noted that a bottom surface of the first flange plate 11 is coplanar with the third junction 19 to provide support for the building stud 23 when forces are directed thereagainst during a sawing or other comparable operation.

Figure 4:
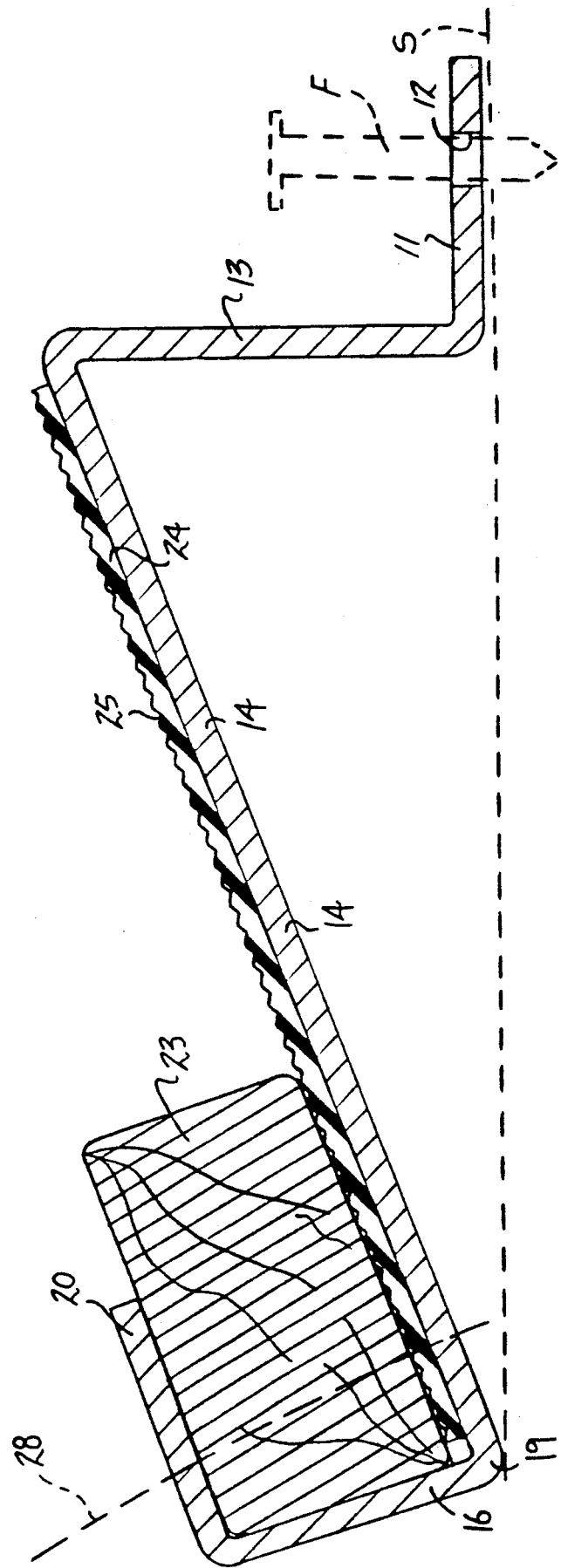
FIG. 4 is an orthographic view, taken along the lines 4—4 of FIG. 1 in the direction indicated by the arrows, with the inclusion of a sheet member mounted to a top surface of the organization third flange plate.

The organization as illustrated in FIG. 4 further includes a ribbed top friction sheet member 24 formed of a polymeric material, with a ribbed top surface 25 to enhance frictional engagement of the stud 23 within the "C" shaped cavity 29, as noted above.

The modification of the building stud support 10a, as illustrated in FIGS. 5 and 6, sets forth the first flange plate 11 fixedly mounted at its bottom surface to an underlying mounting plate 26, with the third junction 19 fixedly mounted to a top surface of the mounting plate 26. A bottom surface of the mounting plate 26 includes a series of equally spaced spikes 27, as well as the fastener "F" directed through an associated opening within the mounting plate 26 rearwardly of the first flange plate 11 to mount the modified support organization 10a in a non-pivotal relationship about the fastener "F".

Accordingly, it should be noted that in use of a saw structure 28 (see FIG. 4), the organization is maintained in a stable and secure relationship during such a procedure, wherein use of the organization, as depicted in FIGS. 1-4, sets forth an organization that may be pivotally rotated about the fastener "F" during periods of non-use for displacement and access of the support surface "S" for other operations.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A building stud support, comprising,
   a serpentine bracket member, including a first planar flange plate, and a second planar flange plate integrally mounted to the first planar flange plate at a first junction line, and
   the second flange plate fixedly and integrally mounted to a third flange plate at a second junction line, and
   the third flange plate extending downwardly relative to the second flange plate defining a first acute angle therebetween, and
   the third flange plate integrally mounted to a fourth flange plate at a third junction line, and the fourth flange plate fixedly and integrally mounted to a fifth flange plate defining an orthogonal relationship therebetween, wherein the fifth flange plate extends over the third flange plate and defines a "C" shaped cavity within the fifth flange plate, fourth flange plate, and third flange plate.

2. An apparatus as set forth in claim 1 wherein the third flange plate includes a polymeric flexible sheet member fixedly mounted to a top surface of the third flange plate to provide frictional engagement of a building stud member mounted within the "C" shaped cavity.

3. An apparatus as set forth in claim 2 wherein the first junction line, the second junction line, the third junction line, and the fourth junction line are each arranged parallel relative to one another.

4. An apparatus as set forth in claim 3 wherein a bottom surface of the first flange plate and the third junction line are arranged in a single plane.

5. An apparatus as set forth in claim 4 wherein the first flange plate includes a through-extending aperture directed therethrough, wherein the through-extending aperture receives a fastener therethrough, and an underlying support, wherein the through-extending fastener is projected into the underlying support to permit pivotment of the first flange plate about the fastener.

* * * * *